United States Patent
Metheral et al.

(10) Patent No.: US 9,586,821 B2
(45) Date of Patent: Mar. 7, 2017

(54) SULFUR DEGASSER APPARATUS AND METHOD

(71) Applicant: SANDVIK PROCESS SYSTEMS LLC, Totowa, NJ (US)

(72) Inventors: Casey J. Metheral, Calgary (CA); Leslie L. Lang, Calgary (CA); Cody J. Wohlers, Strathmore (CA); Sergio A. De Paoli, Calgary (CA); Jamsheed P. Irani, Calgary (CA)

(73) Assignee: Sandvik Process Systems LLC, Totowa, NJ (US)

( * ) Notice: Subject to any disclaimer, the term of this patent is extended or adjusted under 35 U.S.C. 154(b) by 0 days.

(21) Appl. No.: 15/134,970

(22) Filed: Apr. 21, 2016

(65) Prior Publication Data

US 2016/0236935 A1    Aug. 18, 2016

Related U.S. Application Data

(62) Division of application No. 13/598,516, filed on Aug. 29, 2012, now Pat. No. 9,346,677.

(51) Int. Cl.
*B01D 11/04* (2006.01)
*C01B 17/02* (2006.01)
*B01D 11/00* (2006.01)

(52) U.S. Cl.
CPC ........ *C01B 17/0232* (2013.01); *B01D 11/04* (2013.01); *B01D 2011/007* (2013.01)

(58) Field of Classification Search
None
See application file for complete search history.

(56) References Cited

U.S. PATENT DOCUMENTS

| | | | |
|---|---|---|---|
| 4,729,887 | A | 3/1988 | Pendergraft |
| 5,192,467 | A | 3/1993 | Strunc et al. |
| 5,858,283 | A | 1/1999 | Burris |
| 5,935,548 | A | 8/1999 | Franklin et al. |
| 6,149,887 | A | 11/2000 | Lagas et al. |
| 6,676,918 | B2 | 1/2004 | Wu et al. |
| 2006/0033222 | A1 | 2/2006 | Godfrey et al. |

FOREIGN PATENT DOCUMENTS

| | | |
|---|---|---|
| CA | 2170021 C | 1/2000 |
| WO | 9506616 A1 | 3/1995 |
| WO | 2011057718 A1 | 5/2011 |

*Primary Examiner* — Colin W Slifka
(74) *Attorney, Agent, or Firm* — Maria C. Pollick

(57) ABSTRACT

A novel system and method for degassing $H_2S$ and $H_2S_x$ from liquid sulfur (sulphur) is disclosed. The system includes a degassing vessel with a plurality of cells. The cells include a sparging gas mat with a perforated surface at the bottom of the cell to allow the release of air bubbles (or sparging gas) into the cells. A catalyst may be used during the process. As a result, hydrogen sulfide and hydrogen polysulfide are efficiently and effectively removed from the liquid sulfur.

8 Claims, 2 Drawing Sheets

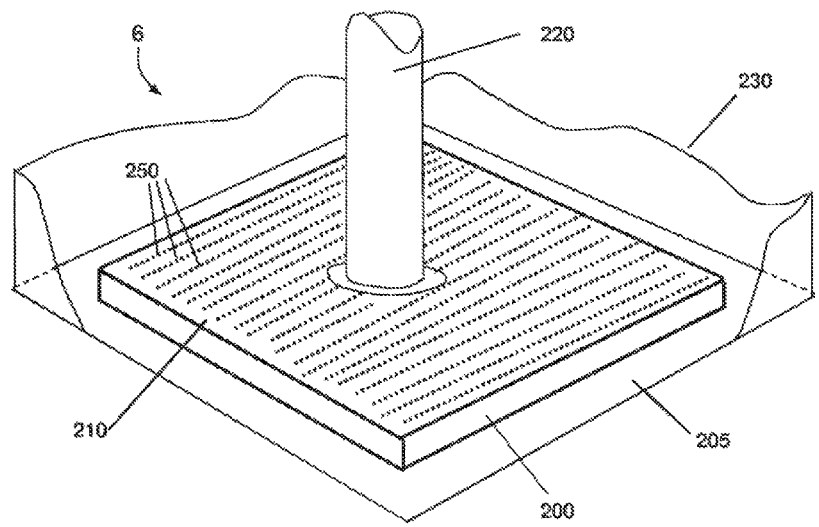
FIG. 2
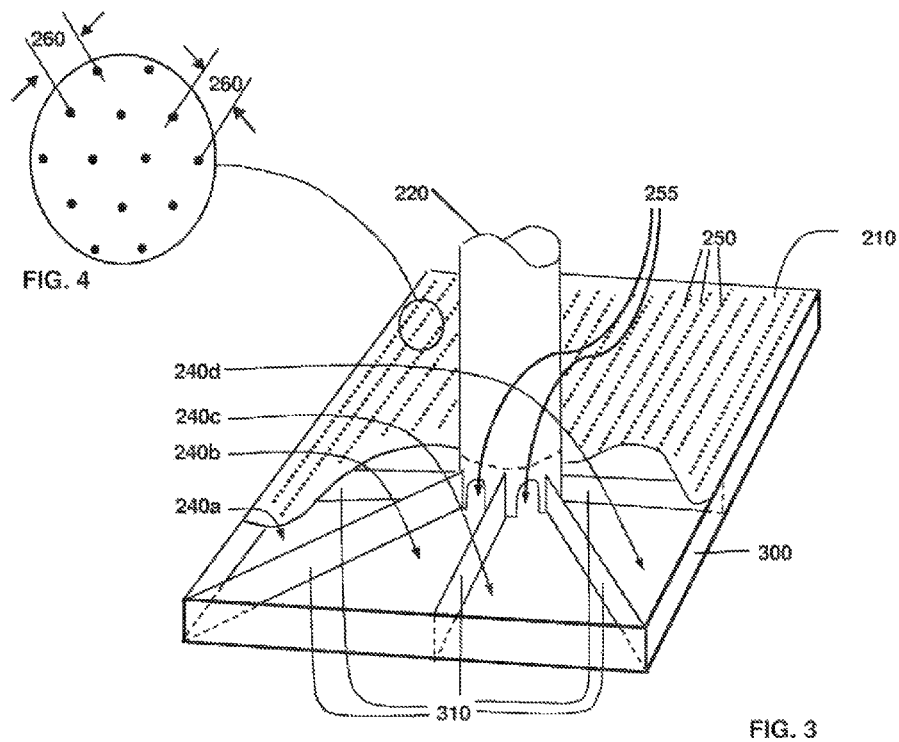
FIG. 4
FIG. 3

SULFUR DEGASSER APPARATUS AND METHOD

CROSS-REFERENCE TO RELATED APPLICATIONS

This application claims the benefit of and is a division of non-provisional U.S. patent application Ser. No. 13/598,516, filed Aug. 29, 2012 which the application is hereby incorporated by reference for all purposes in its entirety.

BACKGROUND OF INVENTION

Field of Invention

The present invention relates to an improved process to remove hydrogen sulfide and hydrogen polysulfide from liquid sulfur (sulphur). Hydrogen sulfide is removed by mass transfer to air bubbles generated by passing air through a perforated plate. A volatile catalyst is used to rapidly decompose hydrogen polysulfide to hydrogen sulfide.

Description of the Related Art

The Claus process is extensively used to produce liquid sulfur from sour oil and gas or other gaseous hydrogen sulfide. It is known in the industry that produced sulfur contains two hydrogen sulfide species, namely, physically dissolved hydrogen sulfide, $H_2S$, and hydrogen polysulfide, $H_2S_x$, which is the reaction product of dissolved $H_2S$ with liquid sulfur. Liquid sulfur produced in processing plants using the Claus process may contain upwards of 500 parts per million by weight (ppmw, where $H_2S_x$ is reported as $H_2S$ equivalent).

The prior $H_2S$-sulfur system involves two coupled reversible reactions, namely the physical dissolution of $H_2S$ in liquid sulfur, which decreases with temperature, (represented by reversible reactions (1 below), where $H_2S_{(g)}$ denotes $H_2S$ in the gas phase and $H_2S_{(d)}$ denotes $H_2S$ dissolved in liquid sulfur) and the existence of a further reversible reaction between dissolved $H_2S$ and liquid sulfur (2 below), which increases with temperature.

(1)

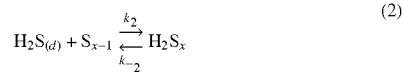
(2)

After production in Claus plants, dissolved $H_2S$ spontaneously degasses into the headspace of tanks and/or vessels found throughout the handling, storage and transportation chain (e.g., pits, tanks, railcars, truck tankers, and the like). Over time, the concentration in the gas phase may reach toxic or explosive levels. The lower explosive limit in air is approximately 4% by volume; the lethal concentration is approximately 600 parts per million by volume (ppmv); In addition, nuisance odor may result from fugitive emissions in concentrations lower than 0.001 ppmv. A need to degas sulfur is apparent in view of the potential accumulation hazardous levels of $H_2S$ in the handling chain. The degassing benchmark generally adopted by the industry (typically to avoid reaching explosive levels during transportation) is 10 parts per million by weight.

The principal considerations with respect to industrial degassers involve the rates at which dissolved $H_2S$ is transferred from the liquid phase into the gas phase (reaction −1) and the decomposition of $H_2S_x$ (reaction −2). The degassing rate of dissolved $H_2S$ may be maximized by (a) producing a large surface for gas-liquid mass transfer and (b) reducing the boundary layer next to the interface through which the dissolved $H_2S$ diffuses to reach gas-liquid surface. Large surface area may be created by generating a myriad of fine sulfur droplets, generating a myriad of bubbles of stripping gas, or packing. In methods using bubbles, the preferred stripping gas in most instances is air because it is cheaper than inert gases or steam, plus air has the additional benefit that a portion of the $H_2S$ and $H_2S_x$ is consumed by reacting with oxygen (reaction products are sulfur and water). Agitation or circulation is almost always part of the process since this enhances the rate of diffusion of dissolved $H_2S$ through the liquid boundary layer surrounding the bubbles.

Whereas dissolved $H_2S$ evolves directly to a gas phase, $H_2S_x$ generally does not. The process whereby $H_2S_x$ is removed is typically via a first decomposition to dissolved $H_2S$ (reaction −2), followed by mass transfer of dissolved $H_2S$ degasses across the gas-liquid boundary (reaction −1). The decomposition reaction tends to be very slow, such that $H_2S_x$ persists as a source of $H_2S$ gas for a long time.

The slow decomposition of $H_2S_x$ represents a main obstacle in the degassing processes. For this reason, various degassing processes make use of a catalyst to accelerate the decomposition reaction. Catalysts may be liquid or solid (generally, a bed of granules). Many different chemical types have been used, including amines. In the past, use of amines fell into disfavor by the industry because solid sulfur, subsequently solidified, was unacceptably friable which resulted in a very dusty product.

Once the $H_2S$ is transferred to the gas phase, it may be removed from the degasser using various removers, such as fans, eductors, and the like. The effluent containing the $H_2S$ extracted from the liquid sulfur may be delivered to an incinerator, a tail gas treatment unit or back to front end of the Claus processing plant.

Numerous degassing patents have been granted, some of which are relevant based on the method used with regards to gas-liquid contact (sparging) and the use of amine-type liquid catalysts. Whereas the degassing rate is critically dependent on the efficiency of sparging, patents that disclose a sparging gas provide little to no description of the sparging apparatus. Illustrative examples from relevant patents are identified below.

U.S. Pat. No. 4,729,887 (Pendergraft) discloses a vessel which is a concrete pit with 3 cells. The middle cell contains a bed of alumina or cobalt-molybdenum impregnated alumina (solid catalyst). Air is delivered to distributor manifold provided with a plurality of perforated pipes under the catalyst bed. Air assists in circulating sulfur through the bed.

U.S. Pat. No. 5,935,548 (Franklin) discloses a system where sulfur is agitated and mixed using an eductor supplied with partly degassed sulfur (which agitates/mixes liquid sulfur). Air is supplied through a pipe and discharged (a) in the vicinity of the eductor (b) into the stream of partly degassed sulfur or (c) to a "sparger" underneath the eductor(s). The sparger appears to consist of a pipe provided with openings. The diameter of the pipe or openings therein is not specified.

U.S. Pat. No. 6,149,887 (Legas) discloses an apparatus consisting of various arrangements of cells and baffles. Heated gas is fed to distributors in each cell. Franklin purports to generate finely divided gas bubbles using tubes with a multiplicity of small openings.

U.S. Pat. No. 6,676,918 (Wu) discloses a method to degas in Claus rundown seal pots. Compressed air is injected under pressure via a line having a small opening nozzle into the annular space of the seal pot.

US patent application 2011/0182802 A1 (Garg) discloses a system that supplies compressed air to a gas diffuser located below a packing. The difusser has a predetermine shape and size and is provided with holes ¼ of openings in the packing. Use of a sintered metal diffuser may also be used.

Canadian Patent No. 2,170,021 (Ellenor) discloses up to four cells equipped with an impeller/shroud assembly. Air is ingested into liquid sulfur by the impeller and the mixture then passed through a perforated shroud creating small bubbles to aerate the cell. High turbulence combined with tiny bubbles results in very fast degassing. A mixture of morpholine and cyclohexylamime is added to catalytically decompose $H_2S_x$. The last cell is dedicated to the removal, by degassing, of the volatile catalyst. Doing so eliminates the objection of producing friable (solid) product.

SUMMARY OF INVENTION

According to one aspect of one or more embodiments of the present invention, the invention consists of a compact, portable, inexpensive apparatus and process that produces a high-quality product with less than 10 ppmw of $H_2S$. Rapid degassing is achieved using a novel sparging system. In one embodiment, the sparging system uses a perforated plate and compartments to produce a high concentration of gas bubbles in the sulfur liquid. The high concentration of gas bubbles rising through the sulfur results in a large surface area and promotes vigorous agitation that results in the rapid removal of hydrogen sulfide. Use of a catalyst such as n amine or a mixture of amines results in the rapid removal of hydrogen polysulfide from the liquid sulfur.

Other aspects of the present invention will be apparent from the following description, drawings and the appended claims.

BRIEF DESCRIPTION OF DRAWINGS

FIG. 2 shows an isometric view of a component of a sparger apparatus in accordance with one or more embodiments of the present invention.

FIG. 3 shows an isometric view of a component of a sparger apparatus in accordance with one or more embodiments of the present invention.

FIG. 4 shows an exploded view of the uniformly spaced perforations of the sparging gas mat in accordance with one or more embodiments of the present invention.

DETAILED DESCRIPTION

Figure 1:
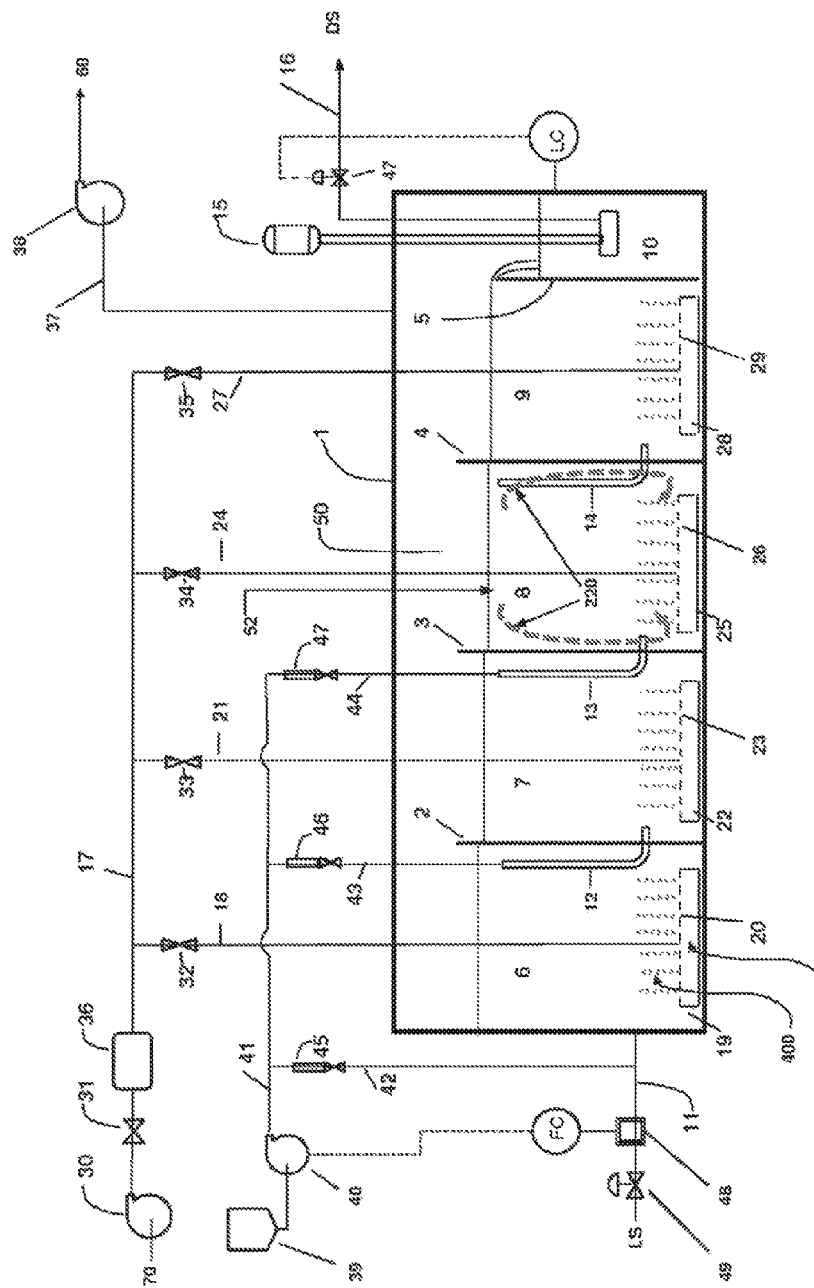
FIG. 1 shows a cutaway elevation view of a degasser apparatus in accordance with one or more embodiments of the present invention.

Specific embodiments of the present invention will now be described in detail with reference to the accompanying figures. Like elements in the various figures are denoted by like reference numerals for consistency. Further, in the following detailed description of embodiments of the present invention, numerous specific details are set forth in order to provide a more thorough understanding of the present invention. In other instances, well-known features have not been described in detail to avoid obscuring the description of embodiments of the present invention.

FIG. 1 shows a cutaway elevation view of a degasser apparatus in accordance with one or more embodiments of the present invention. The degasser apparatus consists of a vessel 1. The shape of the vessel 1 shown in the figure is a box like shape. One skilled in the art will recognize that the shape of the vessel does not have to be a box shaped, rather what is important is that the vessel is sized to suit the production rate. In one embodiment of the present invention, the vessel 1 is box-like, measuring 2.1×6.4×2.5 meters (W×L×H), which is large enough to degas sulfur at 90 tonnes per hour. Higher or lower throughputs are contemplated. That is, degassing throughputs is scalable. Higher throughputs can be accommodated by using more than one degasser in parallel. A scaled-down (smaller) version can be used for throughputs significantly lower than 90 TPH to optimize efficiency and minimize cost in construction, footprint, energy consumption and the like. It is contemplated that the throughputs of the degassing process may be reduced by having cells with reduced volumes, such as smaller footprints.

In one embodiment, the outer walls of vessel 1 are constructed of dimple plates consisting of channels for the passage of steam and condensate. Steam is used to keep the contents in the vessel 1 above the melting point of sulfur. The preferred liquid sulfur temperature range is 125° C. to 155° C. The temperature of the sulfur may be measured (instruments not shown) and controlled by a PCL system. The vessel 1 can also be insulated.

In one embodiment of the present invention, the vessel 1 is provided with partitions 2, 3, 4 and 5 that divide the vessel 1 into four degassing cells 6, 7, 8, 9 and one pump cell 10.

The partition 2, 3, and 4 divide the vessel 1 into a plurality of degassing cells or tanks, each being approximately the same size. The preferred embodiment includes 4 degassing cells. These partitions extend above the normal sulfur level. Also, in the preferred embodiment, the height of partitions 2, 3, and 4 is 1.6 meter tall. The height of partition 5 determines operating sulfur level in cell 9, so it is typically lower than the other cells (generally up to the level of the standpipes (as discussed below)). In plan view, the cells are 2.1 m wide×1.5 m long×2.5 m high. In one embodiment, the liquid sulfur levels 52 (i.e., height) of each cell is somewhat lower from cell to cell as the liquid sulfur traverses the degassing cells 6, 7, 8, 9.

A sulfur line 11 (generally, steam-jacketed) admits liquid sulfur LS (having elevated levels of $H_2S$ and $H_2S_x$) to the cell 6. In the preferred embodiment, the liquid sulfur LS is admitted continuously at an approximately constant rate. The sulfur flows from the cell 6 into the degassing cell 7 through a standpipe 12. Likewise, the liquid sulfur from the cell 7 flows to the degassing cell 8 through a standpipe 13 and from the degassing cell 8 to the degassing cell 9 through a standpipe 14. The liquid sulfur is degassed while in resident in the cells 6 to 9. The cell 9 is further dedicated to the removal of catalyst (as discussed below). A degassed sulfur from the cell 9 flows over a partition 5 into a pump cell 10.

A sulfur pump supplying the liquid sulfur via line 11 may or may not be necessary (and is not shown). In one embodiment, the standpipes 12, 13 and 14 are identical in size and shape. The preferred diameter of the standpipes is 0.10 to 0.30 meter, and further preferred from 0.15 to 0.25 meter. The preferred top to bottom length of the standpipe is 0.3 to 2.0 meter (the height can be variable to get the desired cell liquid volume dictated by desired residence time). The standpipes are supported by bulkhead flanges (not shown) through the partitions. It is also contemplated in a second embodiment of the invention that standpipes not be used to transfer the liquid sulfur from one cell to another. In the second embodiment, sulfur flows from cell to cell through openings (or perforations or slots) in the partitions 2, 3 and 4. The openings may be rectangular perforations/slots or circular holes located close to the floor so that flow entering a cell tends to swept into the column of rising (as disclosed below) gas bubbles.

In the preferred embodiment, a sulfur pump 15 removes the degassed sulfur DS from the pump cell 10 via a line 16. The level in the pump cell 10 is generally maintained by a control valve 47. The sulfur pump 15 or its operation is not always required. In some cases, the degassed sulfur DS in the cell 10 may be simply gravity drained into a pit (not shown). Generally, level control in the pump cell 10 is not strictly required in this case. However, in the preferred embodiment the vessel 1 is "sealed." This means that the exit point from the drain pipe is always below the sulfur level in the pit. The sulfur line 11 is provided with a shutoff valve or flow control valve 49, but is not required.

An air line 17 is in fluid communication with an air line 18 and a sparging gas mat 19 in the cell 6, an air line 21 and a sparging gas mat 22 in the cell 7, an air line 24 and a sparging gas mat 25 in the cell 8 and an air line 27 and a sparging gas mat 28 in the cell 9. In the preferred embodiment, the sparging gas mats 19, 22, 25 and 28 are provided with perforated plates 20, 23, 26 and 29, respectively. A blower 30 is used to provide a sparging gas 70 to the line 17. The pressure in line 17 is controlled by a valve 31. The preferred pressure is 1 to 10 psi (the pressure is dictated primarily by the height of the sulfur above the sparging gas mat (the level may vary, depending on process requirements)). Valves 32, 33, 34 and 35 in the lines 18, 21, 24, and 27, respectively, are provided to control the flow of the sparging gas to each respective sparging gas mat (as discussed below).

It is not critical that every degassing cell gets the same sparging gas flow, but in the preferred embodiment, the sparging gas flow should be roughly equal. According to one or more embodiments of the present invention, a sparging gas mat for each degassing cell is shown in FIGS. 2 and 3. A sparging gas mat 200 consists of a perforated plate 210 that covers a substantial portion of the degassing cells' footprint. In one embodiment of the present invention, the efficiency of the sparging gas mat 200 is due to (a) exposing the liquid sulfur in a cell to small sparging gas bubbles rising up the cell and (b) the upward flow of sparging gas bubbles results in the liquid sulfur being agitated and circulated in the cell(s) (see e.g., induced sulfur circulation 220 for the degassing cell 8, in FIG. 1). The degree of exposure, circulation and agitation of the sparging gas bubbles and the liquid sulfur depends on the air/sulfur ratio. When air is used as the sparging gas, the preferred air/sulfur ratio ranges from 0.008 to 0.15 m³ air per kg sulfur and further preferred from 0.037 to 0.094 m³ air per kg sulfur.

With reference to FIGS. 2 and 3, in one embodiment, the sparging gas mat 200 consists of a welded frame 300 with internal partitions 310. A cutaway view of a cell wall 230 is shown in FIG. 2. The partitions 310 create a multiplicity of compartments or chambers (in the preferred embodiment, the welded frame 300 has eight partitions 310 creating 8 compartments). The perforated plate 210 is attached (in the preferred embodiment, the plate is bolted) to the frame 300 and the partitions 310. A sparging gas pipe 220 (which could be for example, the line 18 in FIG. 1 for the cell 6) is attached at the center of the frame 300. The sparging gas pipe 220 extends to the bottom of the frame 300 where openings 255 are provided for sparging gas to flow into a plurality of compartments 240a, 240b, and 240c, 240d (not shown in this embodiment, are the other 4 compartments of the sparging gas mat 200) below the perforated plate 210. The compartments 240a-h assist in distributing the sparging gas evenly over the surface area of the plate 210.

The sparging gas mats 200 are located at the center of each cell (6, 7, 8 and 9) and are generally positioned centrally on the bottom floor 205 of the cell (6, 7, 8 and 9). In one embodiment, the sparging gas mats 200 measure 0.07×1.3×1.3 meters (surface area), which generally covers 54% of the footprint of the cell's bottom floor 205. The preferred area of mats 200 range from 25% to 95% of the footprint of the cell (6, 7, 8 and 9). As shown in FIG. 1, sparging gas (e.g., air bubbles) 400 from the sparging gas mat 200 rise to the surface where they disengage from the liquid sulfur to occupy a headspace 50. The column of rising air bubbles 400 results in vigorous agitation and circulation 220 of the liquid sulfur.

In one embodiment, perforations, such as holes 250 in the perforated plate 210 are 1.02 mm in diameter on 2.26 mm stagger 260 providing 22% open area, defined as the area of the holes relative to the area of the perforated plate. FIG. 4 illustrates the uniformed spaced holes in the perforated plate 210. In another preferred embodiment, the holes are 0.838 mm in diameter on 3.327 mm stagger 260, providing 5.8% open area. A larger stagger 260 means that the perforations 250 are spaced wider apart which, in combination with smaller holes, reduces the chance that bubbles will coalesce as they rise to the surface of the liquid sulfur. This is desirable since the surface area for mass transfer (hence degassing rate) is not diminished as the bubbles rise through the sulfur column.

Referring to FIG. 1, a sparging gas heater 36 may be provided to heat the sparging gas flowing in the line 17. The sparging gas heater 36 may be used when the vessel 1 is used in very cold climates or environments. The sparging gas heater 36 prevents the liquid sulfur LS from freezing. A line 37 is provided to remove stripping air enriched with $H_2S$ plus other volatile gasses that may be found in liquid sulfur (such as COS, $CS_2$ and $H_2O$), catalyst, water, sparging gas, containing hydrogen sulfide ($H_2S$), sulfur dioxide ($SO_2$), and sulfur vapour out of the headspace 50 of the vessel 1. The gases 60 are removed to downstream treatment (not shown) by a fan 38 which keeps the headspace 50 under slight vacuum.

A catalyst pump 40 supplies a catalyst from a catalyst tank 39 and pumps it to a line 41. The line 41 is in fluid communication with lines 42, 43 and 44 that terminate with a check valve (not shown). The check valves prevent sulfur from flowing up the lines. The line 42 is in fluid communication with the sulfur line 11 in order that the catalyst mixes with the liquid sulfur LS before the liquid sulfur LS enters the degassing cell 6. The line 43 is disposed to flow the catalyst into the standpipe 12 so as to mix with the liquid sulfur in the degassing cell 7. The line 44 is disposed to flow the catalyst into a standpipe 13 to mix with the liquid sulfur in the degassing cell 8. Flow indicator/control valve assemblies 45, 46 and 47 are provided in lines 42, 43 and 44 to control the flow of the catalyst independently to each degassing cell. A sulfur flowmeter 48 is provided in the line 11 to control the rate at which the catalyst is supplied to the line 41. Control systems (not shown) may be used to control the catalyst flow rates.

In the preferred embodiment, the catalyst is usually distributed unequally to the cells 6, 7 and 8. The majority of catalyst is injected into the line 11 and at diminishing rate into the degassing cells 7 and 8. This process allows the catalyst to be depleted by degassing from cell to cell.

The dosage rate of catalyst to each cell is adjusted according to the concentration of $H_2S_x$, which may be known beforehand. Concentration rates are provided to the control system (not shown). In the preferred embodiment, the total catalyst injection rate may range from 0 to 15 ppmw depending on the $H_2S_x$ concentration. In one embodiment, the catalyst is an aqueous mixture of morpholine and cyclohexylamime.

A control system (not showed) may be used to control various components in the novel system, such as rates for the introduction of liquid sulfur and as indicated above, the catalyst into the system and flow rates for the introduction of sparging gases and the removal of effluent gases from the system.

While the invention has been described with respect to a limited number of embodiments, those skilled in the art, having the benefit of this disclosure, will appreciate that other embodiments can be devised which do not depart from the scope of the invention as disclosed herein. It will be apparent to those skilled in the art that various changes may be made without departing from the scope of the invention and the invention is not be considered limited to what is shown and described in the specification and drawings.

The invention claimed is:

1. A method of removing hydrogen sulfide and hydrogen polysulfide from liquid sulfur, comprising the steps of injecting a first sparging gas through a plurality of circular holes in a multi-chambered sparging gas mat;
   agitating the liquid sulfur with the sparging gas in a first cell;
   transferring the agitated liquid sulfur to a second cell;
   injecting a second sparging gas through a second multi-chambered sparging gas mat and agitating the transferred liquid sulfur in the second cell;
   and removing hydrogen sulfide gases and hydrogen polysulfide gases from a headspace in communications with the first cell and the second cell;
   wherein said first and second multi-chambered sparging gas mats each comprise a perforated plate constituting the plurality of holes for releasing the first and second sparging gases into the first and second cells, respectively, and internal partitions attached to the perforated plates thereby creating the plurality of chambers below the perforated plates,
   wherein a plurality of openings in a sparging gas pipe in each respective sparging gas mat provide for sparging gas to flow into the plurality of chambers, and
   wherein said first and second multi-chambered sparging gas mats each includes a frame and internal partitions attached to the frame and to the perforated plate to form the plurality of chambers.

2. The method of claim 1, wherein the sparging gas is air, steam or an inert gas.

3. The method of claim 2, further comprising the step of injecting a catalyst into the first cell and the second cell.

4. The method of claim 3, further comprising the step of removing the liquid sulfur from the second cell to a sulfur pit.

5. The method of claim 2, further comprising the step of introducing a catalyst at a first rate in the first cell and a second rate in the second cell.

6. The method of claim 5, wherein the first rate and the second rate are equal.

7. The method of claim 5, wherein the first rate and the second rate are not equal.

8. The method of claim 1, wherein the circular holes have a diameter of less than 1.02 mm.

* * * * *